(12) United States Patent
Nakamura

(10) Patent No.: US 6,917,761 B2
(45) Date of Patent: Jul. 12, 2005

(54) OPTICAL MULTIPLEXING TRANSMISSION APPARATUS AND SYSTEM

(75) Inventor: Toshio Nakamura, Cupertino, CA (US)

(73) Assignee: Oki Electronic Industry Co., Ltd., Tokyo (JP)

( * ) Notice: Subject to any disclaimer, the term of this patent is extended or adjusted under 35 U.S.C. 154(b) by 662 days.

(21) Appl. No.: 10/098,342

(22) Filed: Mar. 18, 2002

(65) Prior Publication Data

US 2003/0039009 A1 Feb. 27, 2003

(30) Foreign Application Priority Data

Aug. 23, 2001 (JP) ........................................ 2001-252925

(51) Int. Cl.[7] .......................... H04J 14/08; H04B 10/04
(52) U.S. Cl. .......................... 398/98; 398/182; 398/197
(58) Field of Search ............................ 398/98, 182, 197

(56) References Cited

U.S. PATENT DOCUMENTS 5,533,004 A * 7/1996 Jasper et al. ................. 370/204
6,694,104 B1 * 2/2004 Caplan et al. ............... 398/197

* cited by examiner

*Primary Examiner*—M. R. Sedighian
(74) *Attorney, Agent, or Firm*—Venable LLP; Michael A. Sartori

(57) ABSTRACT

An optical multiplexing apparatus converts input signals from multiple channels to an optical signal including optical pulses multiplexed on the time axis, transmits the optical signal, and controls the average power of the transmitted optical signal so as to maintain constant transmission quality even if the input signal on one or more channels is lost. For example, the average power may be held at a target value that varies according to the combined duty cycle of the multiplexed optical pulses. Alternatively, the average optical power may be held constant and dummy signals may be inserted to replace lost input signals, or to fill idle channels until signal input begins.

10 Claims, 3 Drawing Sheets

OPTICAL MULTIPLEXING TRANSMISSION APPARATUS AND SYSTEM

BACKGROUND OF THE INVENTION

1. Field of the Invention

The present invention relates to an apparatus, system, and method for multiplexing signals from a plurality of channels and transmitting them as an optical signal.

2. Description of the Related Art

FIG. 4 shows an example of a time-division multiplexing procedure in which electrical signals (binary signals) from four channels are combined into an optical signal having four times the bit rate of the individual channels. In this example, the electrical signal in each channel is converted to an optical pulse train having a pulse width sufficiently narrow to allow a quadrupling of the bit rate. The four optical pulse trains are combined with different time delays in an optical coupler or similar device, and sent on a transmission line such as an optical fiber.

In optical time-division transmission apparatus of this type, the average optical power of the optical signal being transmitted may vary due to loss of signal on one or more channels, or to new signal supply in a channel that had been lost or idle. FIG. 5 shows an example in which the average optical power of a signal carrying four channels (Ch1–4) is reduced by loss of the third channel (Ch3). The average optical power is reduced because the average number of optical pulses per unit time is reduced, reducing the average duty cycle of the optical signal.

A typical optical signal transmission system including optical time-division transmission apparatus of the above type carries out control to maintain the average optical power of the optical signal at a constant value in order to maintain a constant transmission quality. If the signals on one or more channels are lost during optical signal transmission, however, or if a new signal is supplied in a channel that had been lost or idle, this conventional control scheme may cause problems. An example is shown in FIG. 6. During the transmission of signals on channels 1 to 4, the signals on channel 2 and channel 4 are lost, reducing the average number of optical pulses per unit time, so the power (amplitude) of the individual optical pulses is increased in order to maintain a constant average optical power. Then the signal on channel 3 is also lost, and the power of the individual optical pulse is increased still further. These variations in the power of the individual optical pulses can have adverse effects on the quality of signal transmission, by causing a deterioration of the optical S/N ratio or giving rise to non-linear optical effects.

SUMMARY OF THE INVENTION

An object of the present invention is to provide an improved apparatus and system in which signals from a plurality of channels are multiplexed to generate an optical signal with a steady average optical power, and a constant level of signal transmission quality is maintained even if the input from one or more channels is lost, or new signals are supplied to channels that had been lost or idle.

The invented optical multiplexing apparatus includes means for converting signals from a plurality of channels to an optical signal, transmitting the optical signal, setting a target value, and controlling the average power of the transmitted optical signal so that it is equal to the target value. The transmitted optical signal includes time-division multiplexed optical pulses occurring at an average rate expressed as a duty cycle. In one aspect of the invention, the target value is set according to the duty cycle, so that the individual optical pulses in the transmitted optical signal maintain a constant power. In particular, the target value is altered when the signal on one of the channels is lost.

According to another aspect of the invention, the optical multiplexing apparatus has means for compensating for changes in the duty cycle by, for example, inserting a dummy signal into a channel in which a signal is lost. The duty cycle and target value then remain constant. The optical multiplexing apparatus of this aspect of the invention may form part of an optical multiplexing transmission system in which time-division multiplexing is followed by wavelength-division multiplexing.

DETAILED DESCRIPTION OF THE INVENTION

Figure 1:
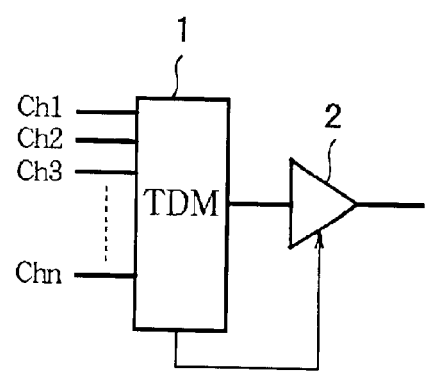
FIG. 1 shows the structure of an optical multiplexing transmission apparatus according to a first embodiment of the invention.

Embodiments of the invention will now be described with reference to the attached drawings, in which like elements are indicated by like reference characters.

As a first embodiment of the invention, a time-division multiplexed transmission apparatus that converts signals from n channels to an optical signal will be described (where n is an integer equal to or greater than two). Each channel has a probability $M_i$ ($i=1, 2, 3, \ldots, n$) of the occurrence of a '1' signal (a signal for which an optical pulse is generated). The value of $M_i$ is from zero to one, the probability of a '0' signal being the complementary value ($1-M_i$). A probability of zero ($M_i=0$) signifies that there are no '1' signals, and no optical pulses are generated. A probability of one ($M_i=1$) signifies that the signal value is always '1' and optical pulses are generated continuously. The probability of occurrence of a '1' in the time-division multiplexed signal has the value $M_{mux}$ given by the following equation (in which the summation is on values of i from 1 to n).

$$M\text{mux} = (\Sigma\, M_i)/n$$

To simplify the explanation, it will be assumed that the power of the individual optical pulses has same value $P_{pulse}$ (watts) in each channel, and the bit rate has the same value N (bits/second) in each channel. The power $P_{total}$ of the optical signal after time-division multiplexing can then be expressed as follows:

$$P\text{total} = M\text{mux} \times N \times P\text{pulse}\ (W)$$

In a typical optical transmission apparatus, the probability of occurrence of a '1' signal in each channel is kept constant by a scrambler or similar device, so Mmux is constant. Therefore, if optical signal power is controlled so as to keep Ptotal at a constant value, Ppulse also has a constant value, which assures constant transmission quality.

However, when the signals on one or more channels are lost, or additional signals are supplied to idle channels, the value of Mmux will vary. For example, if the signal on the j-th channel is lost, Mmux is changed to M'mux as expressed in the following equation.

$$M'\text{mux}=(\Sigma\ Mi)/n-Mj/n$$

If Ptotal is kept at the same constant value, the power of the individual optical pulses must change to a value P'pulse satisfying the following relation (1).

$$P\text{total}=M\text{mux}\times N\times P\text{pulse}=M'\text{mux}\times N\times P'\text{pulse} \quad (1)$$

This relation (1) leads as follows to an expression for the change ΔPpulse in the power of the individual optical pulses.

$$P'\text{pulse}=(M\text{mux}/M'\text{mux})P\text{pulse}$$

$$\Delta P\text{pulse}=P\text{pulse}-P'\text{pulse}=(1-M\text{mux}/M'\text{mux})P\text{pulse}$$

From the above discussion, it can be understood that if the signal on the j-th channel is lost, the power of the individual optical pulse will depart by ΔPpulse from the value (Ppulse) that gives the desired transmission quality.

The apparatus of this embodiment implements one of three procedures (1) to (3), described below, in order to keep the power of the individual optical pulse constant even when signals on one or more channels are lost, or signals are supplied to idle channels.

(1) If Ptotal is allowed to change to a different target value P'total, the above relation (1) can be transformed as follows:

$$P\text{pulse}=P\text{total}/(M\text{mux}\times N)=P'\text{total}/(M'\text{mux}\times N)$$

In order to keep the value for Ppulse constant even if the value of Mmux changes, the value of Ptotal is changed dynamically according to this equation, thereby balancing the change in the value of Mmux.

(2) A dummy signal is supplied for a channel in which a signal is lost. The probability of occurrence of a '1' in the dummy signal is the same as in the lost signal.

(3) A dummy signal is supplied beforehand on a channel in which a new signal may be added later. The probability of occurrence of a '1' in the dummy signal is the same as in the new signal that may be added. When the new signal is actually supplied to the channel, the supply of the dummy signals is stopped.

FIG. 1 shows a structure in which the first embodiment is designed to implement the first procedure (1) above. In this structure, an optical time-division multiplexer (TDM) 1 multiplexes n channels (Ch1 to Chn) and monitors each channel to determine whether the signal on the channel is being successfully supplied or not. If the duty cycle of the multiplexed optical signal is reduced due to loss of signal on at least one channel, the optical time-division multiplexer 1 sends a channel information signal indicating the channel on which the signal has been lost to a transmitting optical amplifier 2. The transmitting optical amplifier 2 amplifies the multiplexed optical signal to obtain a certain target total power Ptotal, but controls Ptotal in response to the channel information signal, thereby generating an optical output signal in which the power Ppulse of the individual optical pulses is held at a constant value.

Figure 2:
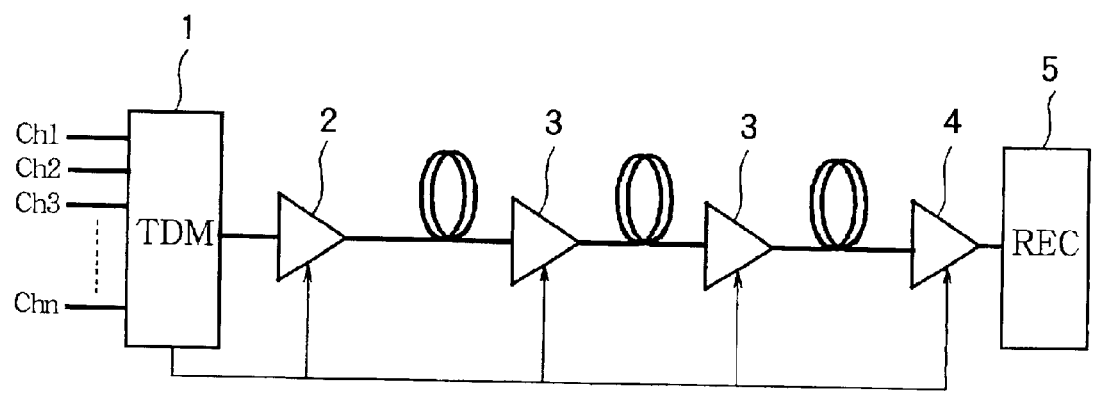
FIG. 2 shows an alternative structure of the first embodiment of the invention.

Referring to FIG. 2, if the value of Ppulse is to be kept constant in relay optical amplifiers 3 and a receiving optical amplifier 4 disposed between the time-division multiplexer 1 and the receiving terminal (REC) 5, the channel information signal from optical time-division multiplexer 1 is sent to the relay optical amplifiers 3 and receiving optical amplifier 4 in addition being sent to the transmitting optical amplifier 2. In this case, the channel information signal can be transmitted via a system monitoring network of the transmission system, or it can be transmitted as an optical signal, along with the signals of other channels. Also, it is possible to detect the duty cycle of the optical signal received at a relay optical amplifier 3 or the receiving optical amplifier 4, and let these amplifiers keep the value of Ppulse constant automatically. In that case, the channel information signal does not have to be transmitted to these amplifiers 3, 4.

Figure 3A:
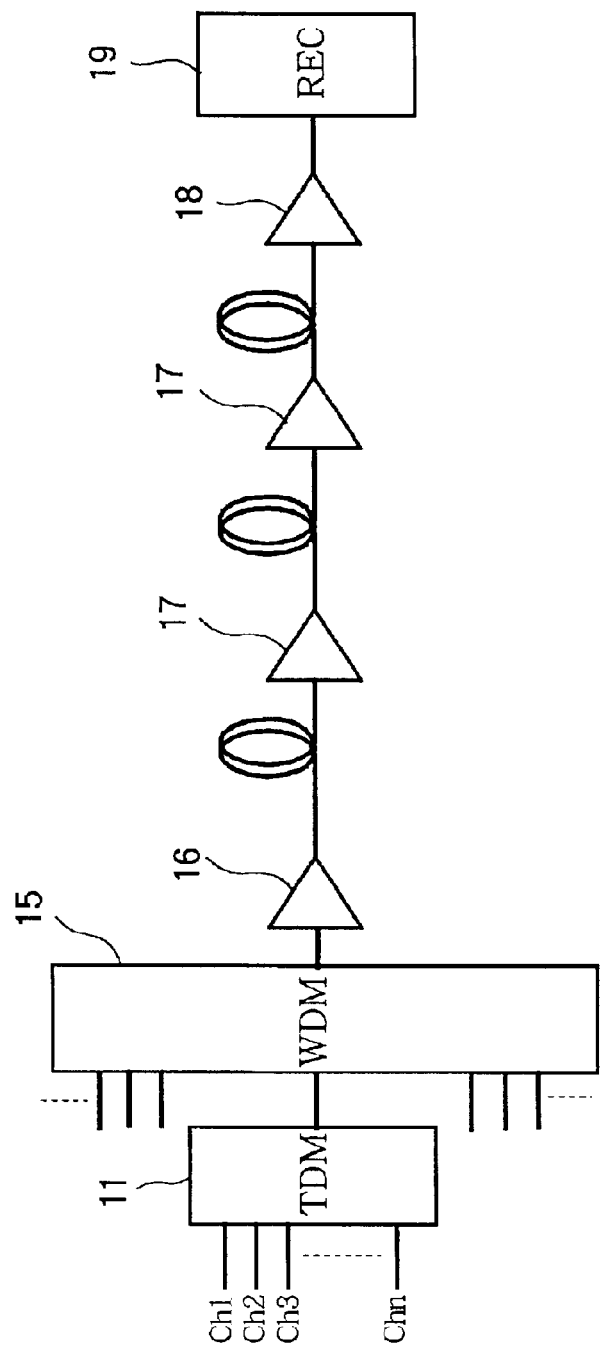
FIG. 3A shows the structure of an optical multiplexing transmission system according to a second embodiment of the invention.

Next, a system according to a second embodiment of the invention will be described with reference to FIGS. 3A and 3B. This system converts signals from a plurality of channels to optical signals that are multiplexed first by time-division multiplexing, then by wavelength-division multiplexing, and transmits the resulting multiplexed optical signal. As shown in FIG. 3A, the system includes an optical time-division multiplexer 11 similar to the optical time-division multiplexer 1 in the first embodiment 1, a wavelength-division multiplexer 15, a transmitting optical amplifier 16, one or more relay optical amplifiers 17, and a receiving optical amplifier 18.

Signals from a plurality of channels are multiplexed by time-division multiplexing in the optical time-division multiplexer 11, and the resulting signal is multiplexed by wavelength-division multiplexing with signals from still further channels in the wavelength-division multiplexer 15. This signal is transmitted through the above amplifiers 16, 17, 18 to a receiving terminal 19. It is difficult to control the power of the optical signal of a specific wavelength (channel) separately after wavelength-division multiplexing, so the second procedure (2) or third procedure (3) described above is used to prevent changes in the power Ppulse of individual optical pulses due to loss of signal on one or more channels, or addition of a new signal to an idle channel. That is, dummy signals are used.

Figure 3B:
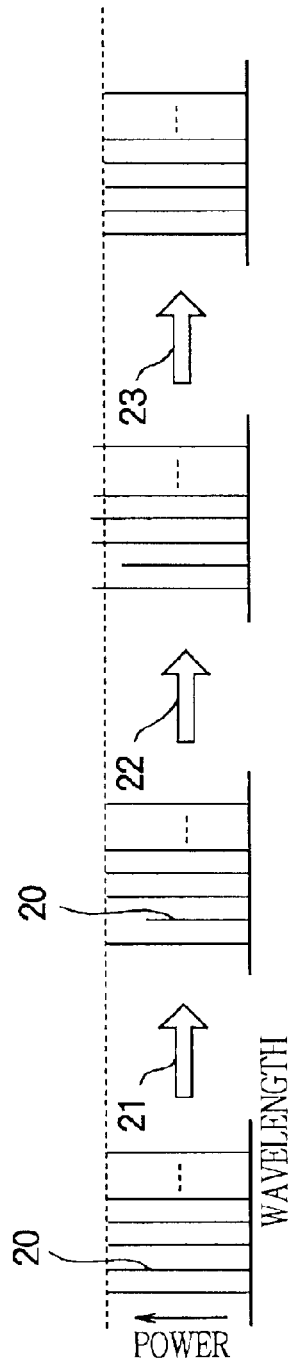
FIG. 3B illustrates the operation of the third embodiment.
Figure 4:
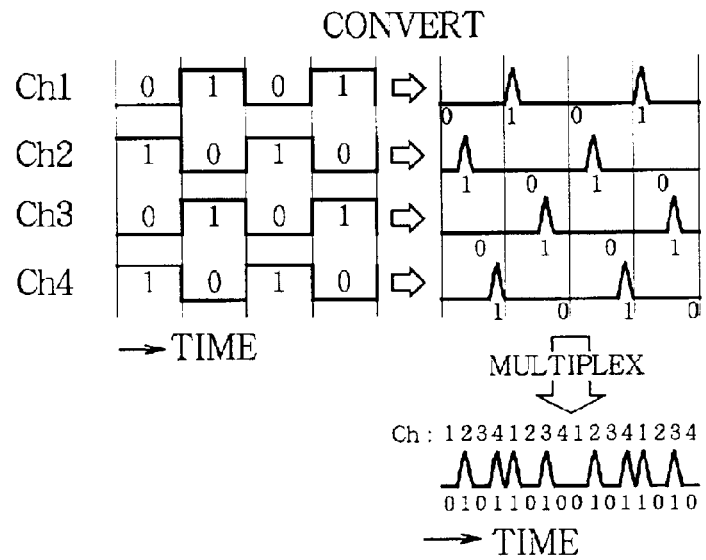
FIG. 4 shows exemplary steps for time-division multiplexing of signals from four channels into one optical signal channel with four times the bit rate of the original channels.
Figure 5:
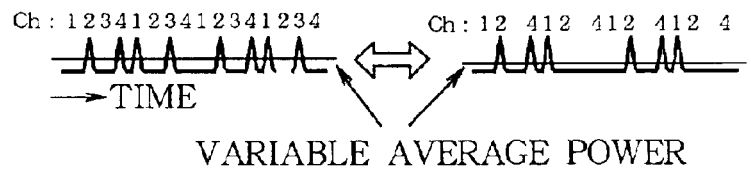
FIG. 5 illustrates a change in the average optical power of an optical signal when one or more multiplexed channels are lost during transmission of the optical signal.
Figure 6:
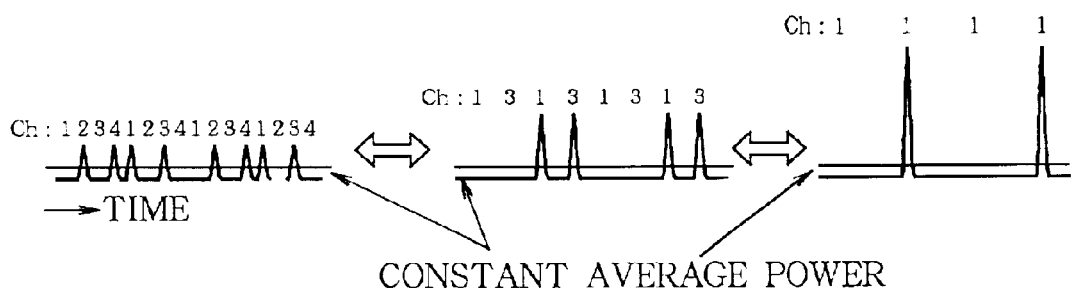
FIG. 6 illustrates changes in the power of individual optical pulses when one or more multiplexed channels are lost during transmission of the optical signal.

An example is shown in FIG. 3B. Wavelength is indicated on the horizontal axis and power on the vertical axis. At first each wavelength has the same power. If one or more channels input into the time-division multiplexer 11 are lost, the optical signal power of the specific wavelength 20 representing the output of time-division multiplexer 11 in the wavelength-division multiplexed signal output from the wavelength-division multiplexer 15 is reduced, as indicated by arrow 21. The transmitting optical amplifier 16 and relay optical amplifiers 17 then raise the power of the transmitted wavelength-division multiplexed signal, to keep the average optical power at a constant value, as indicated by arrow 22. The optical signal power missing in wavelength 20 is thereby made up by the other wavelengths, raising their average power slightly above the normal level indicated by the dotted line. The procedure (2) described above, however, supplies one or more dummy signals to time-division multiplexer 11, returning the optical signal power of the output of the time-division multiplexer 11 to its original value. The optical signal power of the all wavelengths output from the wavelength-division multiplexer 15 then returns to its original value, as indicated by arrow 23.

In an apparatus or system that multiplexes signals from a plurality of channels, obtains an optical signal, and transmits the optical signal at a steady average optical power, the present invention makes it possible to maintain a constant level of signal transmission quality even if signals on one or more channels are lost during optical signal transmission or new signals are supplied on a channel that had been lost of idle.

The invention has been illustrated through the embodiments described above, but those skilled in the art will recognize that the invention can be practiced in other ways within the scope claimed below.

What is claimed is:

1. An optical multiplexing apparatus comprising:
    means for converting signals from a plurality of channels to an optical signal and transmitting the optical signal, the optical signal including time-division multiplexed optical pulses occurring at an average rate expressible as a duty cycle;
    means for controlling an average power of the transmitted optical signal according to a target value, thereby making the average power equal to the target value; and
    means for setting the target value according to said duty cycle so that the individual optical pulses in the transmitted optical signal have a constant power.

2. The optical multiplexing apparatus of claim 1, wherein the means for setting varies the target value when a signal from at least one of the channels is lost.

3. An optical multiplexing apparatus comprising:
    means for converting signals from a plurality of channels to an optical signal and transmitting the optical signal, the optical signal including time-division multiplexed optical pulses occurring at an average rate expressible as a duty cycle;
    means for controlling an average power of the transmitted optical signal according to a target value, thereby making the average power equal to the target value; and
    means for compensating for changes in said duty cycle, so that the individual optical pulses in the transmitted optical signal have a constant power.

4. The optical multiplexing apparatus of claim 3, wherein the means for compensating inserts a dummy signal into a channel in which a signal is lost.

5. An optical multiplexing transmission system comprising:
    at least one optical multiplexing apparatus as recited in claim 3;
    means for converting a plurality of optical signals, at least one of the optical signals being the optical signal output from said at least one optical multiplexing apparatus, to a wavelength multiplexed optical signal and transmitting the wavelength multiplexed optical signal; and
    means for controlling an average power of the transmitted wavelength multiplexed optical signal according to a target value, thereby making the average power of the transmitted wavelength multiplexed optical signal equal to the target value.

6. An optical multiplexing method comprising the steps of:
    (a) converting signals from a plurality of channels to an optical signal including time-division multiplexed optical pulses occurring at an average rate expressible as a duty cycle;
    (b) transmitting the optical signal;
    (c) controlling an average power of the transmitted optical signal according to a target value, thereby making the average power equal to the target value; and
    (d) setting the target value according to said duty cycle, so that the individual optical pulses in the transmitted optical signal have a constant power.

7. The optical multiplexing method of claim 6, wherein said step (d) includes varying the target value when a signal from at least one of the channels is lost.

8. An optical multiplexing method comprising the steps of:
    (a) converting signals from a plurality of channels to an optical signal including time-division multiplexed optical pulses occurring at an average rate expressible as a duty cycle;
    (b) transmitting the optical signal;
    (c) controlling an average power of the transmitted optical signal according to a target value, thereby making the average power equal to the target value; and
    (d) compensating for changes in said duty cycle, so that the individual optical pulses in the transmitted optical signal have a constant power.

9. The optical multiplexing method of claim 8, wherein said step (d) includes inserting a dummy signal into a channel in which a signal is lost.

10. The optical multiplexing method of claim 8, wherein said step (a) further comprises the steps of:
    combining the signals from a subset of said plurality of channels by time-division multiplexing to obtain a first optical signal; and
    combining the first optical signal with at least one second optical signal by wavelength-division multiplexing to obtain the optical signal transmitted in said step (b), the second optical signal including at least one signal from said plurality of channels external to said subset.

* * * * *